United States Patent [19]

Bareket

[11] Patent Number: 4,687,332
[45] Date of Patent: Aug. 18, 1987

[54] SELF-REFERENCING SCAN-SHEAR INTERFEROMETER

[75] Inventor: Noah Bareket, Saratoga, Calif.

[73] Assignee: Lockheed Missiles & Space Company, Inc., Sunnyvale, Calif.

[21] Appl. No.: 787,198

[22] Filed: Oct. 15, 1985

[51] Int. Cl.$^4$ .............................................. G01B 9/02
[52] U.S. Cl. ..................................... 356/353; 356/359
[58] Field of Search ................. 356/353, 354, 359, 360

[56] References Cited

FOREIGN PATENT DOCUMENTS 0057839  5/1977  Japan .................................... 356/353

Primary Examiner—Eugene R. LaRoche
Assistant Examiner—Robert J. Pascal
Attorney, Agent, or Firm—John J. Morrissey

[57] ABSTRACT

A scan-shear interferometer comprises a beamsplitter (11) for dividing an optical beam into a transmitted component I and a reflected component II, which are propagated in opposite directions along a triangular portion of an optical path defined by mirrors (12) and (13) back to the beamsplitter (11), from which the beam component I is transmitted and the beam component II is reflected to a mirror (14), which reflects the beam components I and II coincidentally to form pupils on an interference plane at a photodetector device (15). A rotating prism (16) is positioned so that each of the beam components I and II makes a double pass through the prism (16) before reaching the interference plane. Rotation of the prism (16) causes the pupil formed by the beam component II to remain stationary, and causes the pupil formed by the beam component I to move across the stationary pupil along a scan axis on the interference plane. The photodetector device (15) comprises a linear array of photodetector elements positioned along an axis perpendicular to the scan axis. The mirror (12) is tilted to introduce a shearing of the moving pupil with respect to the stationary pupil along the axis of the photodetector array. Each photodetector element generates an electronic signal indicative of a temporarily varying one-dimensional phase profile of a local portion of the wavefront of the beam. Electronic signals from all the photodetector elements of the array are processed to provide inputs to a standard algorithm for reconstructing a two-dimensional phase distribution of the beam wavefront.

4 Claims, 3 Drawing Figures

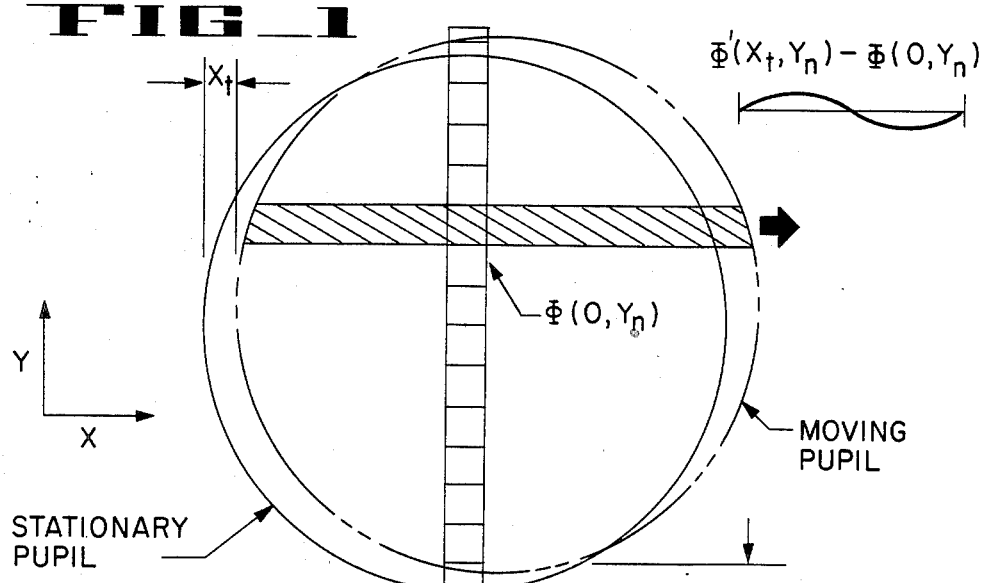
FIG_1
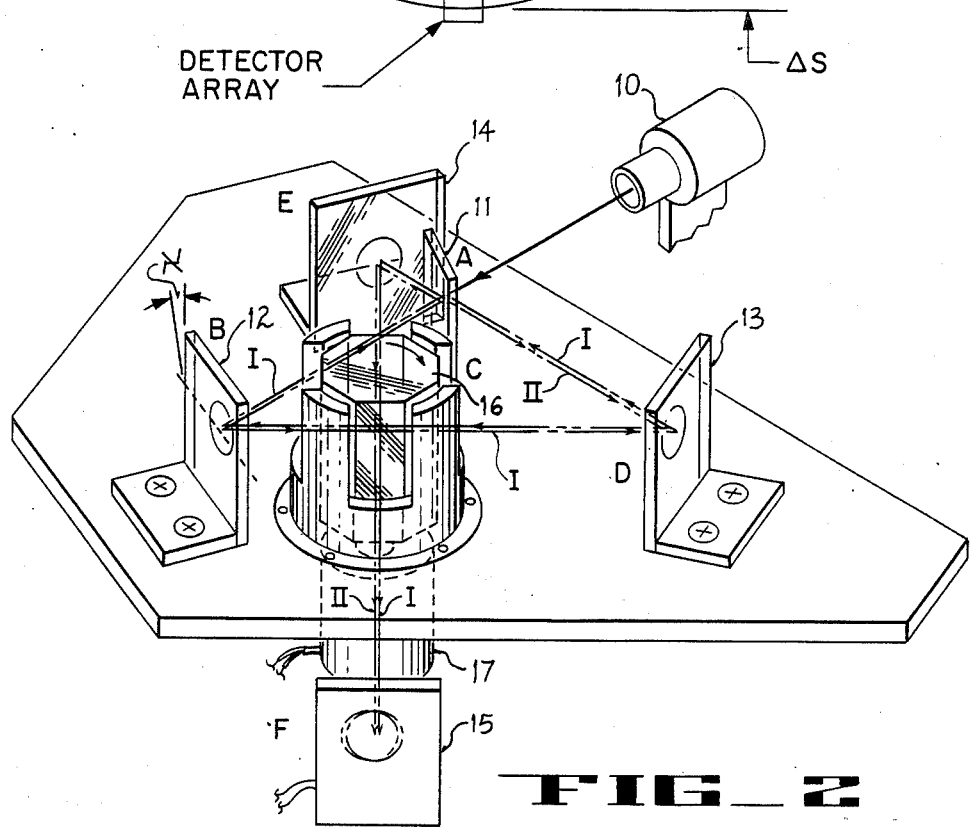
FIG_2

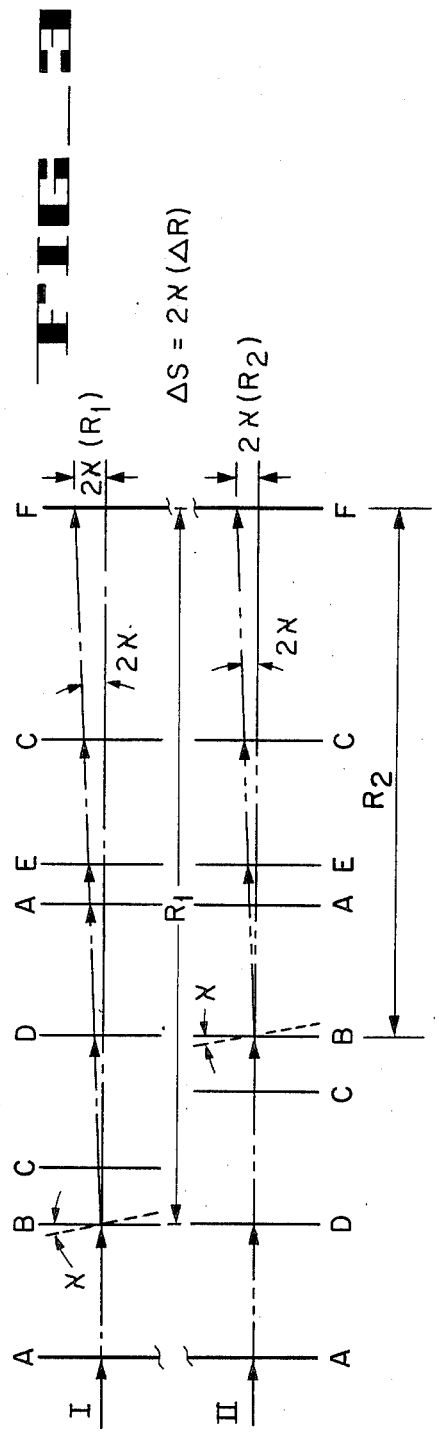

SELF-REFERENCING SCAN-SHEAR INTERFEROMETER

TECHNICAL FIELD

This invention relates generally to optical interferometry, and more particularly to a self-referencing interferometric technique for measuring phase distribution in optical wavefronts.

BACKGROUND ART

Self-referencing interferometers find use in laser beam analysis, in various optical testing procedures, and as wavefront sensors for aligning and controlling adaptive optical systems. The function of a self-referencing interferometer is to measure the phase distribution of an optical wavefront directly without need for a reference wavefront. Self-referencing interferometers used as wavefront sensors are generally required to be highly accurate, light-efficient and stable over relatively long periods of time. Furthermore, self-referencing interferometers are required to be capable of making wavefront phase distribution measurements at high speed. The types of self-referencing interferometers most commonly used in the prior art were point-diffraction interferometers and shearing interferometers.

Point-diffraction interferometers are characterized by low light efficiency, and by sensitivity to focussing and tilt errors. These are significant disadvantages in applications in which the wavefront source is apt to be dim, or in applications in which thermal gradients or mechanical forces are apt to cause structural deformations of the interferometer.

Shearing interferometers generally require complicated optical systems and electronics to obtain wavefront phase measurements along two orthogonal axes simultaneously, and to perform two-dimensional integration for phase reconstruction.

SUMMARY OF THE INVENTION

It is an object of the present invention to provide a self-referencing scan-shear interferometer for measuring the phase distribution of an optical beam wavefront.

A scan-shear interferometer is a new kind of instrument for measuring the phase distribution of an optical beam wavefront. In accordance with the present invention, a scan-shear interferometer comprises means for dividing the beam whose wavefront phase distribution is to be measured into two beam components, which are propagated in opposite directions along a common optical path to a linear array of photodetector elements. A rotating prism is positioned in the optical path so that each of the beam components passes twice through the prism. The double pass through the prism causes one beam component to undergo a zero net lateral displacement, but causes the other beam component to undergo a continuously varying lateral displacement according to the rotation angle of the prism.

The linear array of photodetector elements is positioned at an interference plane, which is selected as a convenient plane at which to measure interference between the wavefronts of the two beam components. The beam component that undergoes zero net lateral displacement defines a stationary pupil on the interference plane, and the beam component that undergoes a continuously varying lateral displacement defines a moving pupil on the interference plane. The prism is oriented so that, as the prism is rotated, the moving pupil is scanned across the stationary pupil along an axis (called the scan axis) that is perpendicular to an axis along which the photodetector array is positioned. The stationary and moving pupils have the same dimensions, and the maximum linear displacement of the moving pupil is at least equal to the width of the pupils.

The axis of the photodetector array is aligned with a specified axis (e.g., the vertical diameter) on the stationary pupil, so that each photodetector element in the linear array detects a corresponding local portion of a constantly changing interferogram produced by the interfering beam component wavefronts. Each photodetector element in the linear array defines a local phase reference as determined by the stationary pupil. The phase of the moving pupil is compared and measured relative to the corresponding local phase reference.

The photodetector elements generate electronic signals, which are processed to produce a series of one-dimensional phase profiles of the beam wavefront. To resolve the local phase reference of each one-dimensional phase profile, the moving pupil is sheared with respect to the stationary pupil by a fixed amount along the axis of the photodetector array (called the shear axis). The shear axis is normal to the scan axis on the interference plane. A two-dimensional phase map of the beam wavefront is then reconstructed from the series of one-dimensional phase profiles by application of a well-known reconstruction algorithm.

A scan-shear interferometer according to the present invention is particularly suitable for applications requiring: (1) long-term stability, which is of considerable importance in environments where thermal gradients and/or accelerations are severe; (2) high efficiency, which is essential when wavefront sources are dim; and (3) high-rate resolution, which is necessary when rapid changes in phase distribution occur for time-varying wavefronts. An interferometer according to the present invention can be readily implemented with commercially available devices in any wavelength region of the optical spectrum from the ultraviolet through the infrared.

DESCRIPTION OF THE DRAWING

FIG. 1 provides a schematic illustration of the principle of operation of a scan-shear interferometer according to the present invention.

FIG. 2 is an illustration in perspective view of a preferred embodiment of a scan-shear interferometer according to the present invention.

FIG. 3 is a graphical representation of the unfolded optical path for each of the beam components propagated through the scan-shear interferometer of FIG. 2, where a fixed amount of pupil shear is introduced by tilting a mirror in the optical path.

BEST MODE OF CARRYING OUT THE INVENTION

The principle of operation of a scan-shear interferometer according to the present invention is illustrated in FIG. 1, which shows a moving pupil (represented by a broken-curve circle) being scanned from left to right across a stationary pupil (represented by a solid-curve circle) at an interference plane. The stationary pupil and the moving pupil are generated in a manner described hereinafter for an optical beam whose wavefront is to be analyzed. Positions on the stationary pupil are defined in terms of a rectangular Cartesian (x, y) coordinate system, and the phase distribution of the wavefront to be analyzed is expressed as a function of position by $\Phi(x, y)$. A linear array of substantially identical photodetector elements is positioned on the interference plane in alignment with a diameter of the stationary pupil on an axis at $x=0$. The optical phase of the stationary pupil at the nth photodetector element located at the coordinates $(0, y_n)$ on the linear array is given by $\Phi(0, y_n)$, which can be considered as a local phase reference designated as $\Phi_r(y_n)$.

As the moving pupil is scanned along an axis (called a scan axis) in the x-direction across the stationary pupil, the interfering wavefronts of the moving and stationary pupils produce a continuously varying interferogram. The output of the nth photodetector element of the linear array is proportional to the irradiance distribution, which is given by $$I_n = I_0 + I_1 \cos [\Phi'(x_t, y_n) - \Phi_r(y_n)], \quad (1)$$

where $I_n$ is the intensity of the interference pattern measured by the nth photodetector element, $I_0$ is the average intensity of the interference pattern, $I_1$ is the modulation amplitude of the interference pattern, $\Phi'(x_t, y_n)$ is the phase of the wavefront of the moving pupil, and $x_t$ is the x-coordinate of the measured wavefront phase of the moving pupil at time t. The phase of the wavefront of the moving pupil is compared and measured relative to the local phase reference $\Phi_r(y_n)$ for each of the photodetector elements in the array, thereby providing a series of one-dimensional phase profiles $$\Delta\Phi_n(x_t) = \Phi'(x_t, y_n) - \Phi_r(y_n). \quad (2)$$

The local phase reference of each one-dimensional phase profile is resolved by shearing the moving pupil with respect to the stationary pupil by a fixed amount along an axis (called a shear axis) coincident with the axis of the photodetector array. As illustrated in FIG. 1, a shear $\Delta S$ occurs in the y-direction, which is perpendicular to the scan axis. The magnitude of the shear $\Delta S$ is chosen according to the desired sensitivity and dynamic range of the wavefront phase measurement. The minimum required amount of shear is equal to the width of a photodetector element in the array. The phase measurement sensitivity can be increased by increasing the amount of shear in increments of the width of a photodetector element.

To resolve the local phases, the phase differences $\Delta\Phi_n(x_t)$ along the photodetector array are recorded by the individual photodetector elements at $t=0$, at which time the moving and stationary pupils exactly overlap along the scan axis (i.e., the x-axis in FIG. 1). Assuming that the amount of shear is equal to the width of one photodetector element, a series of measurements $\Delta\Phi_n(0)$ is obtained as follows:

$$\left.\begin{array}{l}\Delta\Phi_1(O) = \Phi_r(y_1) = \Phi_O \\ \Delta\Phi_2(O) = \Phi_r(y_2) - \Phi_r(y_1) \\ \Delta\Phi_3(O) = \Phi_r(y_3) - \Phi_r(y_2) \\ \vdots \\ \Delta\Phi_n(O) = \Phi_r(y_n) - \Phi_r(y_{n-1})\end{array}\right\} \quad (3)$$

The local phase references are then calculated by applying the conventional one-dimensional reconstruction algorithm:

$$\Phi_r(y_n) = \Phi_O + \sum_{k=1}^{n} \Delta\Phi_k(O), \quad (4)$$

where the arbitrary phase $\Phi_0$ is inconsequential to the measurement and is therefore ignored. Once the reference phases $\Phi_r(y_n)$ are resolved, a two-dimensional phase map is constructed for the wavefront of the optical beam. The algorithm of equation (4) is discussed in, e.g., *Optical Shop Testing*, edited by Daniel Malacara, (John Wiley and Sons, 1978), chapter 4.

A scan-shear interferometer operating according to the above-described principle is illustrated in triangular format in FIG. 2. An input beam whose wavefront is to be analyzed emanates from an unspecified source 10 and impinges upon a beamsplitter 11, which divides the input beam into a transmitted component (designated as component I) and a reflected component (designated as component II). The transmitted component I is represented by a single-dashed broken line, and the reflected component II is represented by a double-dashed broken line.

The beamsplitter 11 can be a polarizing beamsplitter, which causes the transmitted and reflected components I and II of the input beam to have different (and preferably orthogonal) polarization states with respect to each other. Although it is not essential to the practice of the present invention that the beam components I and II have different polarization states, such a feature would make it possible to use phase-shifting methods to obtain electronic measurements of the optical phase of the wavefront. A particular phase-shifting method for obtaining electronic measurements of the optical phase is described in an article entitled "Three-Channel Phase Detector for Pulsed Wavefront Sensing" by N. Bareket, which appeared in *Proceedings of the Society of Photo-Optical Instrumentation Engineers* (SPIE), Vol. 551, (1985).

The two beam components I and II originate at a common entrance pupil on the beamsplitter 11, and are propagated along a common optical path (although in opposite directions along a triangular portion of the path) through the interferometer to an interference plane at which a photodetector device 15 is positioned. Thus, as illustrated in FIG. 2, the beam component I is transmitted through the beamsplitter 11 and propagates counterclockwise to a mirror 12, for reflection therefrom to a mirror 13, for reflection therefrom back to the beamsplitter 11, for transmission therethrough to a mirror 14. At the mirror 14, the beam component I is reflected to the photodetector device 15. Simultaneously, the beam component II is reflected from the beamsplitter 11 in a clockwise direction around the triangular portion of the optical path, i.e., to the mirrors 13 and 12 in sequence and thence back to the beamsplitter 11, for reflection from the beamsplitter 11 to the mirror 14. At the mirror 14, the beam component II is reflected coincidentally with the beam component I to the photodetector device 15.

The beam components I and II form pupils on the interference plane at the position of the photoelectric device 15. In the absence of any means to introduce a lateral displacement of one of the pupils with respect to the other, the two pupils would coincide with each other on the interference plane. However, it is a characteristic feature of the present invention that a means is provided to introduce a lateral displacement of one of the pupils with respect to the other.

As illustrated in FIG. 2, a rotatable prism 16 (preferably of octagonal cylindrical configuration) is positioned so that each of the beam components I and II makes two passes therethrough before reaching the photodetector device 15. Thus, the beam component I makes a first pass through the prism 16 on a leg of the triangular portion of the optical path from the mirror 12 to the mirror 13, and a second pass through the prism 16 on a leg of the optical path from the mirror 14 to the photodetector device 15. Similarly, the beam component II makes a first pass through the prism 16 on a leg of the triangular portion of the optical path from the mirror 13 to the mirror 12, and a second pass through the prism 16 on the leg of the optical path from the mirror 14 to the photodetector device 15.

In operation, the prism 16 is rotated at a constant rate by a motor 17 to cause a lateral displacement D of each of the beam components I and II according to the equation $$D = T \sin \theta [1 - \cos \theta (n^2 - \sin^2 \theta)^{-\frac{1}{2}}], \quad (5)$$

where n is the refractive index of the prism, T is the thickness of the prism (as measured between parallel faces), and $\theta$ is the angle of incidence of the beam component upon the face of the prism. A discussion of equation (5) is found in texts such as *Modern Optical Engineering* by W. J. Smith, McGraw Hill (1966), page 87.

The mirror 14 is aligned so that the direction of propagation of the beam components I and II toward the photodetector device 15 is exactly perpendicular to the path of the beam components I and II (in either direction) between the mirrors 12 and 13. Therefore, because of the octagonal cross-sectional configuration of the rotating prism 16 in the embodiment illustrated in FIG. 2, the angle of incidence $\theta$ of the beam components I and II upon a facet of the prism 16 is exactly the same on their second pass through the prism 16 as on their first pass through the prism 16. The effect of the second pass of the beam component I (travelling counterclockwise around the triangular portion of the optical path) through the prism 16 is to double the lateral displacement resulting from the first pass of the beam component I through the prism 16. However, the effect of the second pass of the beam component II (travelling clockwise around the triangular portion of the optical path) through the prism 16 is to null the lateral displacement resulting from the first pass of the beam component II through the prism 16. Thus, the beam component II, which undergoes a net zero lateral displacement as the prism 16 rotates, forms a stationary pupil on an interference plane at which the photodetector device 15 is located. However, the beam component I, which undergoes a continuously varying lateral displacement according to the angle of incidence $\theta$ upon the prism 16, forms a moving pupil that scans across the stationary pupil on the interference plane.

It is a feature of the present invention that the photodetector device 15 comprises a linear array of photodetector elements arranged on the interference plane (as illustrated schematically in FIG. 1) along an axis, which is normal to the portion of the optical path of the beam components I and II from the beamsplitter 11 to the photodetector device 15, and which is also normal to the path travelled by the moving pupil in scanning across the stationary pupil. The path of the moving pupil in scanning across the stationary pupil defines the scan axis of the interferometers, as described above in the discussion of FIG. 1. It is a further feature of the present invention that the moving pupil is sheared with respect to the stationary pupil on the interference plane along the axis of the photodetector array, which defines the shear axis of the interferometer.

The total double-pass lateral displacement of the moving pupil with respect to the stationary pupil is about 4.8 wD, where w is the width of a facet of the prism 16 upon which the beam components I and II are incident for a given angle of incidence $\theta$, and where D is determined by equation (5) for that given angle $\theta$. The variation of the lateral displacement D with respect to the angle of incidence $\theta$ is substantially linear for angles less than 20°. (At an angle of incidence of 20°, the deviation from linearity of the curve representing the variation of lateral displacement D with respect to the angle of incidence $\theta$ is less than 3%.)

A fixed amount of shear $\Delta S$ is introduced in accordance with the present invention by tilting the mirror 12 about the scan axis through a small angle $\chi$ (e.g., about 20 to 60 seconds of arc). The shearing effect caused by the tilting of the mirror 12 is illustrated graphically in FIG. 3 in which the optical path is unfolded and plotted for each of the beam components I and II. Thus, the location of the beamsplitter 11 on the unfolded optical path for each of the beam components I and II is indicated in FIG. 3 by a vertical marker designating position A. The transmitted beam component I is shown proceeding from the beamsplitter 11 to the mirror 12 located at position B. Since the mirror 12 is tilted through the small angle $\chi$ to introduce a shear of the moving pupil relative to the stationary pupil, the tilt of the mirror 12 is indicated in FIG. 3 by a slanted dashed-line marker at an angle $\chi$ with respect to a vertical marker designating position B. The beam component I is then reflected from the mirror 12 into the rotating prism 16 located at position C at an angle equal to $2\chi$ from the optical axis. The beam component I passes through the prism 16 to the mirror 13 located at position D, from which the beam component I is reflected back through the beamsplitter 11 at position A to the mirror 14 located at position E. The mirror 14 reflects the beam component I on a second pass through the prism 16 at position C to the interference plane on the photodetector device 15 at position F.

Similarly, the reflected beam component II is shown in FIG. 3 proceeding from the beamsplitter 11 at position A to the mirror 13 located at position D. The mirror 13 then reflects the beam component II into the rotating prism 16 at position C. The beam component II passes through the prism 16 to the mirror 12 at position B, from which the beam component II is reflected back to the beamsplitter 11 at position A. The beamsplitter 11 reflects the beam component II to the mirror 14 at position E, from which the beam component II is reflected on a second pass through the prism 16 at position C to the interference plane on the photodetector device 15 at position F. The positions A, B, C, D, E and F on the unfolded optical path in FIG. 3 are also indicated adjacent the corresponding optical components of the interferometer in FIG. 2.

The effect on the beam components I and II caused by the tilting of the mirror 12 is graphically illustrated in FIG. 3, wherein the length of the portion of the optical path of the beam component I from the mirror 12 to the photodetector device 15 is indicated as $R_1$, and the length of the portion of the optical path of the beam component II from the mirror 12 to the photodetector device 15 is indicated by $R_2$. The position of the moving pupil formed by the beam component I is angularly displaced by $2\chi R_1$ from the position that it would have in the absence of any tilting of the mirror 12, and the position of the stationary pupil formed by the beam component II is angularly displaced by $2\chi R_2$ from the position that it would have in the absence of any tilting of the mirror 12, where $\chi$ is a small angle. The net shear $\Delta S$ of the moving pupil with respect to the stationary pupil is given by $$\Delta S = 2\chi \Delta R, \tag{6}$$

where $\Delta R = R_1 - R_2$.

A description has been presented herein of a particular embodiment of a self-referencing scan-shear interferometer according to the present invention. However, practitioners skilled in optical interferometry, upon perusing the foregoing specification and the accompanying drawing, would be able to device other embodiments that would be particularly suitable for special applications. Thus, the foregoing description is to be understood as illustrating the invention, which is more generally defined by the following claims and their equivalents.

I claim:

1. A self-referencing interferometer for measuring phase distribution of an optical beam wavefront, said interferometer comprising:
   (a) means for splitting said optical beam into a first component and a second component, and for causing said first component to form a first pupil at an interference plane, and for causing said second component to form a second pupil at said interference plane, and for shearing said first pupil by a fixed amount relative to said second pupil along a shear axis on said interference plane;
   (b) means for causing a continuously and repetitively varying displacement of said first pupil with respect to time across said second pupil along a scan axis on said interference plane, said scan axis being perpendicular to said shear axis; and
   (c) a linear array of photodetector elements arranged on said interference plane along said shear axis, each photodetector element of said array generating an electronic signal indicative of a temporally varying one-dimensional phase profile of a local portion of said optical beam wavefront, electronic signals from said linear array of photodetector elements providing inputs to an algorithm for reconstructing a two-dimensional phase distribution of said optical beam wavefront.

2. The interferometer of claim 1 wherein said means for splitting said optical beam into said first and second components and for causing said first and second components to form said first and second pupils, respectively, comprises:
   (a) a beamsplitter for dividing said beam into said first and second components;
   (b) a prism; and
   (c) a plurality of reflective elements positioned with respect to said beamsplitter and with respect to each other to cause each of said first and second components to make two passes through said prism along an optical path from said beamsplitter to said interference plane, said reflective elements causing said first and second components to be propagated in opposite directions along a portion of said optical path.

3. The interferometer of claim 2 wherein one of said reflective elements is oriented with respect to others of said reflective elements to cause said first pupil to be sheared relative to said second pupil along said shear axis.

4. The interferometer of claim 3 wherein said means for causing said first pupil to move across said second pupil along said scan axis comprises means for rotating said prism.

* * * * *